US008582144B2

(12) United States Patent  
Tsujimoto

(10) Patent No.: US 8,582,144 B2  
(45) Date of Patent: Nov. 12, 2013

(54) INFORMATION PROCESSING DEVICE CONNECTABLE TO MULTIFUNCTION PRINTER VIA COMMUNICATION NETWORK, MULTIFUNCTION PRINTER, EXTERNAL AUTHENTICATION SYSTEM FOR MULTIFUNCTION PRINTER, AND NON-TRANSITORY COMPUTER-READABLE RECORDING MEDIUM

(75) Inventor: Kunihiko Tsujimoto, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 1221 days.

(21) Appl. No.: 12/386,625

(22) Filed: Apr. 21, 2009

(65) Prior Publication Data

US 2009/0262381 A1    Oct. 22, 2009

(30) Foreign Application Priority Data

Apr. 22, 2008 (JP) ................................ 2008-111488

(51) Int. Cl.
*G06F 3/12* (2006.01)
*H04L 29/06* (2006.01)

(52) U.S. Cl.
USPC .......................................... 358/1.15; 713/161

(58) Field of Classification Search
USPC ................................ 358/1.14, 1.15; 340/5.74
See application file for complete search history.

(56) References Cited

U.S. PATENT DOCUMENTS

| 2006/0209337 | A1* | 9/2006 | Atobe et al. | 358/1.15 |
| 2006/0283937 | A1* | 12/2006 | Daniel et al. | 235/382 |
| 2007/0011446 | A1* | 1/2007 | Kato et al. | 713/150 |
| 2007/0159663 | A1 | 7/2007 | Tsujimoto | |

FOREIGN PATENT DOCUMENTS

| CN | 1536807 A | 10/2004 |
| CN | 1878176 A | 12/2006 |
| JP | 2004-363920 A | 12/2004 |
| JP | 2006-195883 A | 7/2006 |
| JP | 2007-174400 | 7/2007 |
| JP | 2007-219711 | 8/2007 |
| JP | 2007-233444 A | 9/2007 |
| JP | 2007-323120 A | 12/2007 |

* cited by examiner

*Primary Examiner* — Benny Q Tieu
*Assistant Examiner* — Sunil Chacko
(74) *Attorney, Agent, or Firm* — Edwards Wildman Palmer LLP; David G. Conlin; David A. Tucker

(57) ABSTRACT

In an external authentication system for a multifunction printer according to the present invention, a USB device management section, according to an instruction from a USB device management section instructing section, (i) performs a virtualization process for virtually connecting an information processing device to a user information reading device which is locally connected to a multifunction printer, (ii) manages a status of the connection between the information processing device and the user information reading device; and a multifunction printer association management section associates the multifunction printer controlled by the information processing device with the user information reading device which is locally connected to the multifunction printer. This allows providing a system in which an information processing device can control a plurality of multifunction printers, and carry out user authentication by controlling, via a communication network, USB devices for reading user information which are locally connected to the multifunction printers, respectively.

13 Claims, 15 Drawing Sheets

| USER ID | LOGIN NAME | PASSWORD |
|---|---|---|
| 1 | User 1 | Pass 1 |
| 2 | User 2 | Pass 2 |
| ... | ... | ... |
| N | User N | Pass N |

| USER ID | COPY FUNCTION | SCAN FUNCTION | FACSIMILE FUNCTION | PRINT FUNCTION |
|---|---|---|---|---|
| 1 | AVAILABLE | AVAILABLE | AVAILABLE | AVAILABLE |
| 2 | AVAILABLE | UNAVAILABLE | UNAVAILABLE | AVAILABLE |
| ... | ... | ... | ... | ... |
| N | AVAILABLE | AVAILABLE | AVAILABLE | AVAILABLE |

FIG. 10

```xml
<?xml version="1.0" encoding="utf-8"?>
<ns:Envelope xmlns:ns="http://www.w3.org/2001/12/soap-envelope">
  <ns:Body>
    <Hello>
      <IPAddress>192.0.0.10</IPAddress>
      <MACAddress>01:23:45:67:89:AB</MACAddress >
    </Hello>
  </ns:Body>
</ns:Envelope>
```

FIG. 12

```
<?xml version="1.0" encoding="utf-8"?>
<ns:Envelope xmlns:ns="http://www.w3.org/2001/12/soap-envelope">
   <ns:Body>
     <Bye>
        <IPAddress>192.0.0.10</IPAddress>
        <MACAddress>01:23:45:67:89:AB</MACAddress >
     </Bye>
   </ns:Body>
</ns:Envelope>
```

FIG. 14

```xml
<?xml version="1.0" encoding="utf-8"?>
<ns:Envelope xmlns:ns="http://www.w3.org/2001/12/soap-envelope">
  <ns:Body>
    <GetUSBDiviceResponse>
      <USBDevice>
        <Id>1</Id>
        <Serial-Number>XXXXXXXX</Serial-Number>
        <Vender-Id>123</Vender-Id>
        <Vender-Name>Sharp</Vender-Name>
        <Product-Id>12345678</Product-Id>
        <Product-Name>Sharp Card Reader</Product-Name>
      </USBDevice>
    </GetUSBDiviceResponse>
  </ns:Body>
</ns:Envelope>
```

FIG. 16

| USER ID | MODEL NAME OF MULTIFUNCTION PRINTER | IP ADDRESS OF MULTIFUNCTION PRINTER | SERIAL NUMBER OF USB DEVICE | MODEL NAME OF USB DEVICE |
|---|---|---|---|---|
| 1 | MODEL 1 | 192.0.0.10 | 123456 | CARD READER 1 |
| 2 | MODEL 2 | 192.0.0.11 | 234567 | CARD READER 2 |
| ... | ... | ... | ... | ... |
| N | MODEL N | 192.0.0.200 | 987654 | CARD READER N |

INFORMATION PROCESSING DEVICE CONNECTABLE TO MULTIFUNCTION PRINTER VIA COMMUNICATION NETWORK, MULTIFUNCTION PRINTER, EXTERNAL AUTHENTICATION SYSTEM FOR MULTIFUNCTION PRINTER, AND NON-TRANSITORY COMPUTER-READABLE RECORDING MEDIUM

This Nonprovisional application claims priority under 35 U.S.C. §119(a) on Patent Application No. 2008-111488 filed in Japan on Apr. 22, 2008, the entire contents of which are hereby incorporated by reference.

TECHNICAL FIELD

The present invention relates to an external authentication technique for a multifunction printer which is carried out in such a manner that (i) the multifunction printer reads user information via a USB device connected to the multifunction printer, and (ii) the multifunction printer sends the read user information, via a communication network, to an information processing device for carrying out user authentication.

BACKGROUND ART

There have been known a multifunction printer which includes a plurality of functions such as a copying machine, a scanner, a printer, or a facsimile. Further, the development of a communication network allows realizing the following technique. In a case where the multifunction printer and a controlling apparatus including an information processing device are connected to each other via a communication network, it is possible that (i) the controlling apparatus outputs document data to the multifunction printer and the multifunction printer forms a document image corresponding to the received document data, or (ii) the multifunction printer activates software that is stored in the information processing device.

For example, Patent Literature 1 disclose a system established by combining a multifunction printer with an information processing device which can carry out a certain process that can not be carried out by a multifunction printer itself.

In this system, the information processing device provides a menu screen for the multifunction printer to the multifunction printer via a network. The multifunction printer (i) displays the received menu screen so as to accept input from a user, and (ii) sends data of the input to the information processing device via the network. The information processing device carries out an operation in accordance with the input data received from the multifunction printer.

This allows, for example, the multifunction printer to print out a document that is scanned by the multifunction printer and is translated into another language by the information processing device in such a manner that the information processing device (i) receives a document image scanned by the multifunction printer, (ii) carries out optical character recognition (OCR) of the document image, so as to recognize character data and (iii) translates the character data into another language, and (iv) sends the translated character data to the multifunction printer for printing out.

Further, as described in Patent Literature 1, such multifunction printers have been carried out the following operations such as limiting functions available in a multifunction printer depending on a user. This limiting the availability of functions is carried out in such a manner that (i) a USB device such as an IC card reader, a biometric authentication device, or the like is connected to the multifunction printer so as to obtain user information, (ii) the obtained user information is sent to an information processing device via a communication network for user authentication, and (iii) based on a result of the user authentication, the available functions of the multifunction printer are limited to functions permitted to the user.

On the other hand, Patent Literature 2 teaches a remote device control program which realizes a transparent use of a peripheral device at a driver level via a network. With this program, a peripheral device such as a USB device which is locally connected to a computer can be used by another computer as if the peripheral device were locally connected to the another computer.

CITATION LIST

Patent Literature 1

Japanese Patent Application Publication, Tokukai, No. 2007-174400 (Publication Date: Jul. 5, 2007)

Patent Literature 2

Japanese Patent Application Publication, Tokukai, No. 2007-219711 (Publication Date: Aug. 30, 2007)

In a system which carries out user authentication for a multifunction printer by use of an information processing device that is connected to the multifunction printer via a network as in Patent Literature 1, it is necessary to install a driver of an IC card reader, a biometric authentication device, or the like to the multifunction printer to which the IC card reader, the biometric authentication device, or the like is connected.

Therefore, in the conventional system, in a case where an ID reading device such as the IC card reader or the biometric authentication device is replaced with another ID reading device, it is necessary to change the driver installed in the multifunction printer. In particular, in a case where a standard of the IC card reader is renewed, it is absolutely necessary to develop or renew firmware of the multifunction printer corresponding to the new standard of the IC card reader. This causes a problem in that the development or renewal of the firmware of the multifunction printer requires too much time and cost because the development or renewal should be carried out in accordance with each standard of the multifunction printers.

Patent Literature 1 discloses a system in which the multifunction printer works in combination with the information processing device, however, fails to disclose how to control a USB device that is connected to the multifunction printer, and therefore this cannot solve the problem.

In the field of the information processing device, there have been known that any one of a plurality of information processing devices on a network can access to a shared USB device. It seems that, by using this technique, it is easy to establish a system in which each of the information processing devices on the network can access to a biometric authentication device or an IC card reader that is connected to a multifunction printer.

In this case, however, the biometric authentication device or the IC card reader connected to the multifunction printer is managed individually by each of the information processing devices on the network. This allows any information processing devices on the network to carry out user authentication based on user information which is read by the biometric authentication device or the IC card reader.

In this situation, the multifunction printer cannot find out which information processing device is one to carry out a user authentication based on the read user information. Therefore the multifunction printer requests user authentication to a plurality of information processing devices that share the biometric authentication device or the IC card reader. As a result, it may cause a problem such that one information processing device successfully authenticates a user by referring to user information data that is registered in the information processing device; on the other hand, another information processing device fails to authenticate the user because the user information data is not registered in the another information processing device.

SUMMARY OF INVENTION

An object of the present invention is to provide an information processing device, a multifunction printer, an external authentication system for a multifunction printer, a program, and a recoding medium, each of which can carry out an user authentication in such a manner that the information processing device, via a communication network, (i) manages a plurality of multifunction printers and (ii) controls USB devices for reading user information which are locally connected to the multifunction printers, respectively.

To attain the object, an information processing device of the present invention which is connectable to at least one multifunction printer via a communication network, carries out user authentication based on user information read by a USB device that is locally connected to a multifunction printer, and controls, according to a result of the user authentication, the multifunction printer to which the USB device is locally connected, the information processing device includes: a USB device management portion for (i) requesting the multifunction printer to allow the information processing device to be connected to the USB device which is locally connected to the multifunction printer and (ii) carrying out a virtualization process for virtually connecting the USB device to the information processing device, and (iii) controlling a status of the connection between the information processing device and the USB device which is virtually connected to the information processing device; and a multifunction printer association management section for associating the multifunction printer controlled by the information processing device with the USB device that is locally connected to the multifunction printer.

Further, to attain the object, a multifunction printer of the present invention to which a USB device for reading user information is locally connected, the multifunction printer is connected to, via a communication network, an information processing device which controls functions of the multifunction printer in such a manner that (i) the multifunction printer sends user information read by the USB device to the information processing device, and (ii) the information processing device carries out user authentication based on the received user information, and (iii) the information processing device controls the functions of the multifunction printer based on a result of the user authentication, the multifunction printer including: a USB device controlling section (i) which controls the USB device locally connected to the multifunction printer to be accessible from the information processing device by virtually connecting the USB device to the information processing device in response to a connection request from the information processing device to request the USB device controlling section to allow the information processing device to be connected to the USB device, (ii) which, after the USB device is virtually connected to the information processing device, controls the USB device not to be virtually connected to other information processing devices, and which (iii) in response to a USB device disconnection request from the information processing device, controls the USB device to be inaccessible from the information processing device.

An external authentication system for a multifunction printer according to the present invention includes the information processing device of the present invention and the multifunction printer of the present invention.

According to an arrangement of the external authentication system, in the information processing device, the USB device management section establishes a virtual connection between a USB device and the information processing device as if the USB device were locally connected to the information processing device, and manages a status of the connection between the USB device and the information processing device, even though the USB device is locally connected to a multifunction printer.

Further, in the multifunction printer, the USB device controlling section can establish a virtual connection or disconnect the virtual connection according to a request from the information processing device. Once a USB device is virtually connected to an information processing device, the USB device controlling section performs such control that the USB device is not virtually connected to other information processing devices.

This allows handling a plurality of USB devices as if they were locally connected to the information processing device, regardless of the fact that the USB devices are connected to the information processing device via a communication network, and are locally connected to multifunction printers, respectively.

Therefore, it is not necessary to install a driver of the USB device onto a multifunction printer to which the USB device is locally connected. It is possible to use the USB device of the multifunction printer by installing the driver of the USB device onto the information processing device.

Accordingly, a model change of a USB device to be used by a multifunction printer does not necessitate a new driver installation for the multifunction printer. If the information processing device has already had a driver corresponding to the new USB device, the new USB device is ready to use by merely connecting to a multifunction printer.

Further, in a case where a standard of the USB device is changed, an adjustment is required only for the information processing device and development or renewal of firmware for each of the multifunction printers is not necessary. This allows significantly reducing time and cost in comparison with a case of developing new firmware in accordance with each standard of the multifunction printers.

However, the above management of the connection status between a USB device and an information processing device performed by the USB device management section does not allow to associate a USB device with a multifunction printer to which the USB device is locally connected, in a case where a plurality of USB devices are virtually connected to an information processing device.

According to the arrangement, the multifunction printer management section associates a multifunction printer with a corresponding USB device. Therefore, even in a case where a plurality of USB devices are virtually connected to the information processing device, the USB devices actually being locally connected to the multifunction printers, respectively, the information processing device can control, according to a result of user authentication based on user information read by a USB device, a multifunction printer to which the USB device is locally connected by associating the multifunction printers with the corresponding USB devices, respectively.

As a result, it is possible to establish an external authentication system for a multifunction printer which can easily deal with a change of a USB device in a standard or a model by using a multifunction printer having the above arrangement in combination with the information processing device of the present invention.

Other objectives, characteristics, and advantages of the present invention shall become clear according to the following description. Also, benefits of the present invention shall become clear according to the following description with reference to the accompanying drawings.

BRIEF DESCRIPTION OF DRAWINGS

FIG. 10 is a drawing illustrating a sample of a boot notification.

FIG. 12 is a drawing illustrating a sample of a termination notification.

FIG. 14 is a drawing illustrating a sample of a response to a USB device information acquisition request.

FIG. 16 is a drawing illustrating a sample of multifunction printer management information managed by a multifunction printer management section.

FIG. 17 is a flow chart showing a process in which the multifunction printer management section associates a multifunction printer with a user information reading device when a multifunction printer is turned on.

DESCRIPTION OF EMBODIMENTS

The following explanation deals with one embodiment of the present invention with reference to FIG. 1 through FIG. 17. Note that the present invention is not specifically limited to this embodiment.

In an external authentication system of the present embodiment, an information management device (i) controls, via a communication network, USB devices serving as user information reading devices which are locally connected to multifunction printers, respectively, and (ii) carries out external authentication of user information by managing a connection status of each of the user information reading devices.

Figure 2:
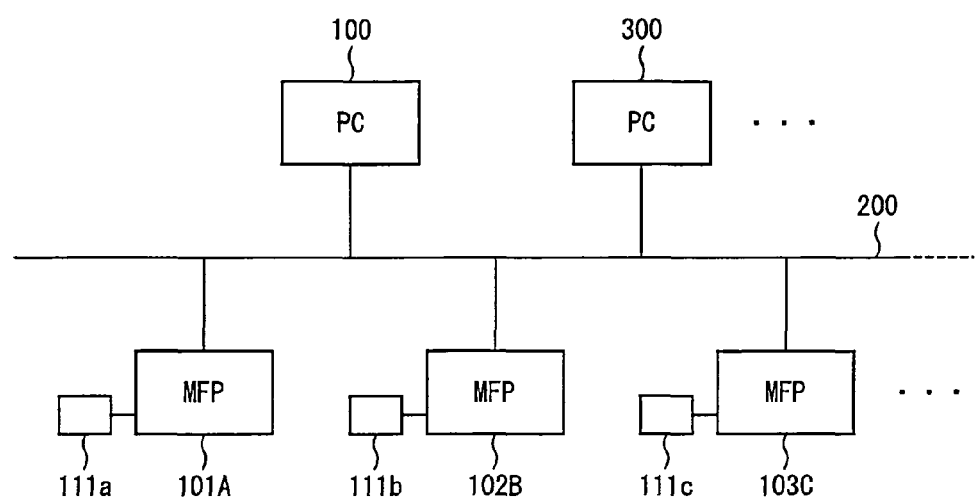
FIG. 2 is an explanatory view illustrating a connection situation of the external authentication system. In the external authentication system, information management apparatuses are connected to multifunction printers via a communication network.

FIG. 2 illustrates a connection situation of the external authentication system according to the present embodiment in which an information processing device 100 is connected to a plurality of multifunction printers 101 via a LAN (local area network) 200 that is constructed by Ethernet serving as a communication network.

In an example illustrated in FIG. 2, a plurality of multifunction printers 101A, 101B, 101C, ..., are connected to the LAN 200, the multifunction printers 101 ... having similar arrangements. The multifunction printers 101A, 101B, 101C, ..., are connected locally with user information reading devices 111A, 111B, 111C, ..., respectively. (User information reading devices 111A, 111B, 111C are USB devices herein.) In addition to the information processing device 100, an information processing device 300 and the like are also connected to the LAN 200.

The multifunction printer 101 is a multifunction printer (MFP) which incorporates a plurality of functions in one, such as copying, scanning (image reading function), printing (image forming function), sending image data (communication function), image conversion, or the like. For example, a multifunction printer includes a printer, a copying machine, a facsimile, a scanner, and/or an arithmetic device for conducting image transmission, image conversion, and/or image processing.

It is not necessary that the multifunction printers 101 ... include all of the above functions. For example, some multifunction printers may include a scanning function (image reading function) and a communication function, and other multifunction printers may include a printing function (image forming function) and a communication function.

In the information processing device 100, various kinds of applications are installed. The information processing device 100 carries out processes corresponding to the applications installed therein, and can communicate with the multifunction printers 101 ... via the LAN (communication network) 200.

Figure 1:
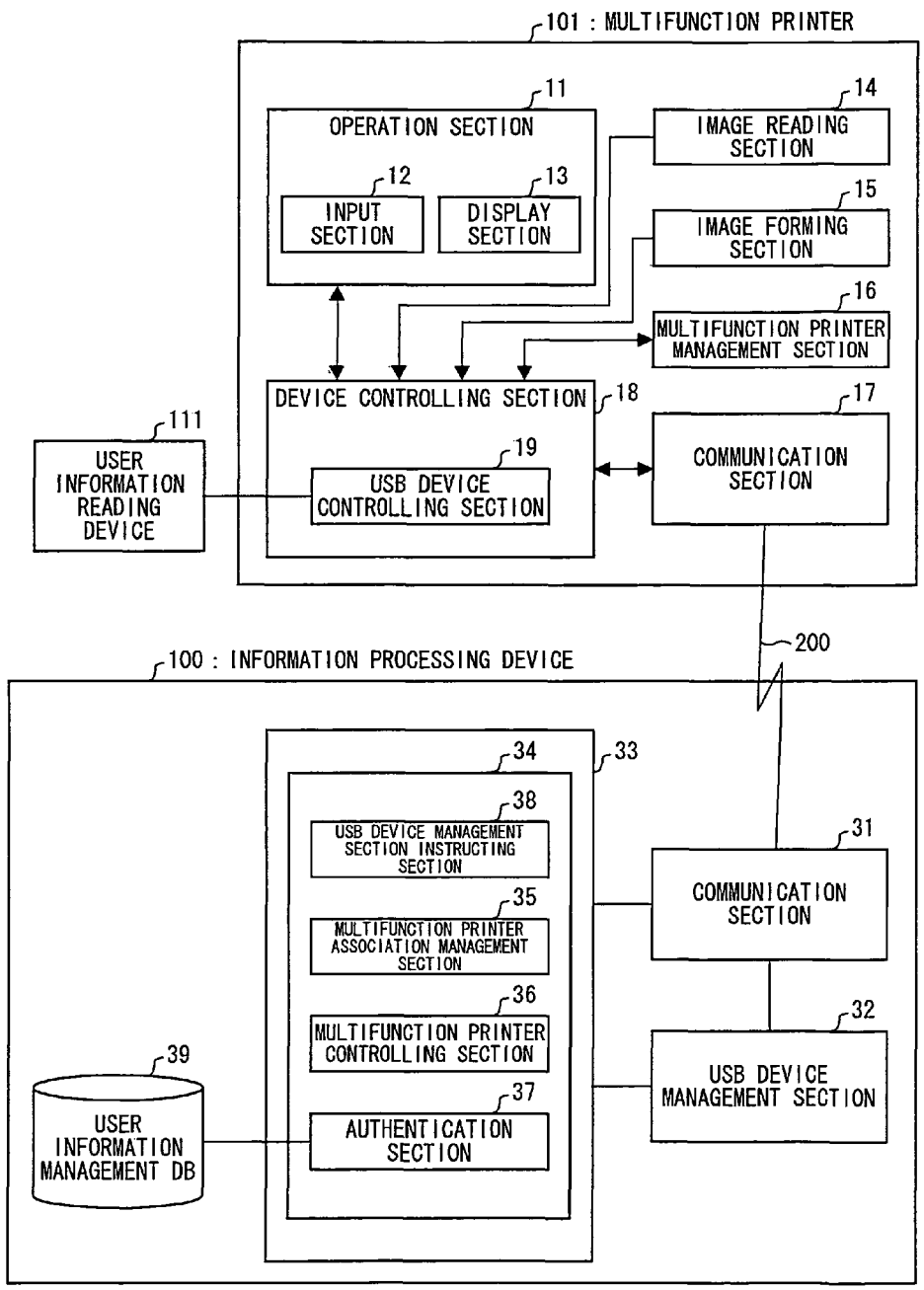
FIG. 1 is a block diagram of an embodiment of the present invention illustrating an example of an overview arrangement of an external authentication system for a multifunction printer.

The following explanation deals with functional arrangements of the multifunction printer 101 and the information processing device 100 with reference to FIG. 1. FIG. 1 is a block diagram illustrating an overview arrangement of the external authentication system of the present embodiment.

As illustrated in FIG. 1, the multifunction printer 101 includes an operation section 11, an image reading section 14, an image forming section 15, a multifunction printer management section 16, a communication section 17, a device controlling section 18, and a USB device controlling section 19.

The operation section 11 is a user interface including a display section 13 for displaying an operation screen for a user, and an input section 12 for accepting input from a user.

In this embodiment, a touch panel system including a liquid crystal display or the like is used as the display section 13, whereby the display section 13 also serves as the input section 12.

The image reading section 14 is for reading an image of a document that is set in the multifunction printer 101 so as to obtain image data. The image forming section 15 is for printing the image data received from the image reading section 14 or image data externally inputted via the LAN 200.

The multifunction printer management section 16 is a memory for managing information such as registration information of the applications in the information processing device 100 which is connected to the multifunction printer 101 via the LAN 200. The communication section 17 is for communicating with the information processing device 100 via the LAN 200.

The device controlling section 18 is for controlling each of the functions of the multifunction printer 101. Further, the device controlling section 18 includes the USB device controlling section 19 for controlling a USB device serving as the user information reading device 111 that is locally connected to the multifunction printer 101.

In response to a connection request (described later), from the information processing device 100 to request the USB device controlling section 19 to allow the information processing device 100 to be connected to a user information reading device 111 which is locally connected to the multifunction printer 101, the USB device controlling section 19 performs such control that the user information reading device 111 becomes accessible from the information processing device 100. Further, once the user information reading device 111 is virtually connected to the information processing device 100, the USB device controlling section 19 performs such control that the user information reading device 111 will not to be virtually connected to other information processing devices such as the information processing device 300 or the like that is connected to the LAN 200 and is equivalent to the information processing device 100 functionally.

Further, in response to a disconnection request (described later), from the information processing device 100 to request the USB device controlling section 19 to disconnect the virtual connection between the information processing device 100 and the user information reading device 111, the USB device controlling section 19 performs such control that the user information reading device 111 becomes inaccessible from the information processing device 100.

Detailed explanation about the processes carried out by the USB device controlling section 19 and a concrete arrangement of the USB device controlling section 19 for carrying out the processes are described in Patent Literature 2. Therefore, further explanation is omitted in the present application.

The USB device controlling section 19 may be, for example, "SX-2000U2 USB device server" manufactured by silex technology, Inc.

The user information reading device 111 is a USB device which can read user information for identifying a user. Specifically, the user information reading device 111 can be realized by an IC card reader or a biometric information reading device which can read biological information such as fingerprint information. The user information reading device 111 is locally connected to the USB device controlling section 19.

As illustrated in FIG. 1, the information processing device 100 includes a communication section 31, a USB device management section 32, an application section 33, a multifunction printer application 34, a multifunction printer association management section 35, a multifunction printer controlling section 36, an authentication section 37, a USB device management section instructing section 38, and a user information management database (called a user information management DB hereinafter) 39.

The communication section 31 is for communicating with the plurality of multifunction printers 101A, 101B, 101C, ..., or other information processing devices such as the information processing device 300 via the LAN 200 (see FIG. 2).

According to an instruction from the USB device management section instructing section 38 (described later), the USB device management section 32 (i) requests a multifunction printer 101 to allow the information processing device 100 to be connected to a user information reading device 111 that is locally connected to the multifunction printer 101, (ii) carries out a virtualization process for virtually connecting the user information reading device 111 to the information processing device 100, and (iii) managing the virtual connection between the user information reading device and the information processing device 100.

What is meant by virtually connecting the information processing device 100 to the user information reading device 111 is that the information processing device 100 connects to the user information reading device 111 as if the user information reading device 111 were locally connected to the information processing device 100, even though the fact that the user information reading device 111 of the multifunction printer 101 is actually connected to the information processing device via the LAN 200.

In this application, it is not limited to establish a virtual connection between one information processing device 100 and one user information reading device 111. The information processing device 100 can virtually connect to a plurality of user information reading devices of a plurality of multifunction printers 101 via the LAN 200.

The USB device management section 32 can be realized by installing a remote device controlling program that is described in details in Patent Literature 2. Same as the USB device controlling section 19 in the multifunction printer 101, detailed explanation about the virtualization process carried out by the USB device management section 32 and a concrete arrangement of the USB device management section 32 for carrying out the virtualization process are described in Patent Literature 2. The virtualization process is to establish a virtual connection between the information processing device 100 and the user information reading device 111 by sending a USB device connection request. Further explanation is omitted in the present application.

The application section 33 is a block for carrying out processes corresponding to various applications. The application section 33 includes the multifunction printer application 34 which controls and manages the multifunction printer 101. A multifunction printer association management section 35, a multifunction printer controlling section 36, an authentication section 37, a USB device management section instructing section 38 are established by carrying out a process corresponding to the multifunction printer application 34. The multifunction printer application 34 includes applications corresponding to various standards of the multifunction printers 101 for controlling them.

The multifunction printer association management section (multifunction printer association management means) 35 is for managing the multifunction printers 101 which are controlled by the information processing device 100. In the present embodiment, the multifunction printer association management section 35 associates each multifunction printer 101 with a user information reading device 111 which is locally connected to the multifunction printer 101.

As described above, the USB device management section 32 establishes virtual connections as if the user information reading devices 111 were locally connected to the information processing device 100, even though the user information reading devices 111 are actually locally connected to the multifunction printers 101, respectively. Only based on information for identifying the multifunction printers 101, however, the information processing device 100 cannot associate each multifunction printer 101 with a user information reading device 111 which is locally connected to the multifunction printer 101. Accordingly, it is necessary to establish the association in some way. A specific technique for establishing the association will be described later.

The authentication section 37 is for carrying out user authentication based on user information read by the user information reading device 111 by referring to the user information management DB 39 which includes user information for a plurality of users. The read user information is successfully authenticated by the authentication section 37 if user information identical with the read user information is registered in the user information management DB 39.

The multifunction printer controlling section 36 is for controlling availability of functions of the multifunction printer 101. The functions of the multifunction printer 101 include a printer function, a copy function, a facsimile function, a scanner function, an image transfer function, or the like. Once the user information is successfully authenticated by the authentication section 37, the multifunction printer controlling section 36 controls availability of functions of the multifunction printer 101 according to the authenticated user information. This allows the multifunction printer 101 to provide the functions depending on a user.

The USB device management section instructing section 38 is for controlling the USB device controlling section 19 by sending an instruction to the USB device management section 32. When a multifunction printer 101 on the LAN 200 is turned on, the USB device management section instructing section 38 instructs the USB device management section 32 to carry out a virtualization process by sending a USB device connection request (described later) to the multifunction printer 101 that is turned on. Further, when a multifunction printer 101 on the LAN 200 is turned off, the USB device management section instructing section 38 instructs the USB device management section 32 to terminate management of the connection status by sending a USB device disconnection request (described later) to the multifunction printer 101 to be turned off.

The USB device management portion (USB device management means) of the present invention includes (i) the USB device management section instructing section 38 that is realized by the multifunction printer application 34, and (ii) the USB device management section 32 that is realized by the remote device controlling program described in Patent Literature 2.

Figure 3:
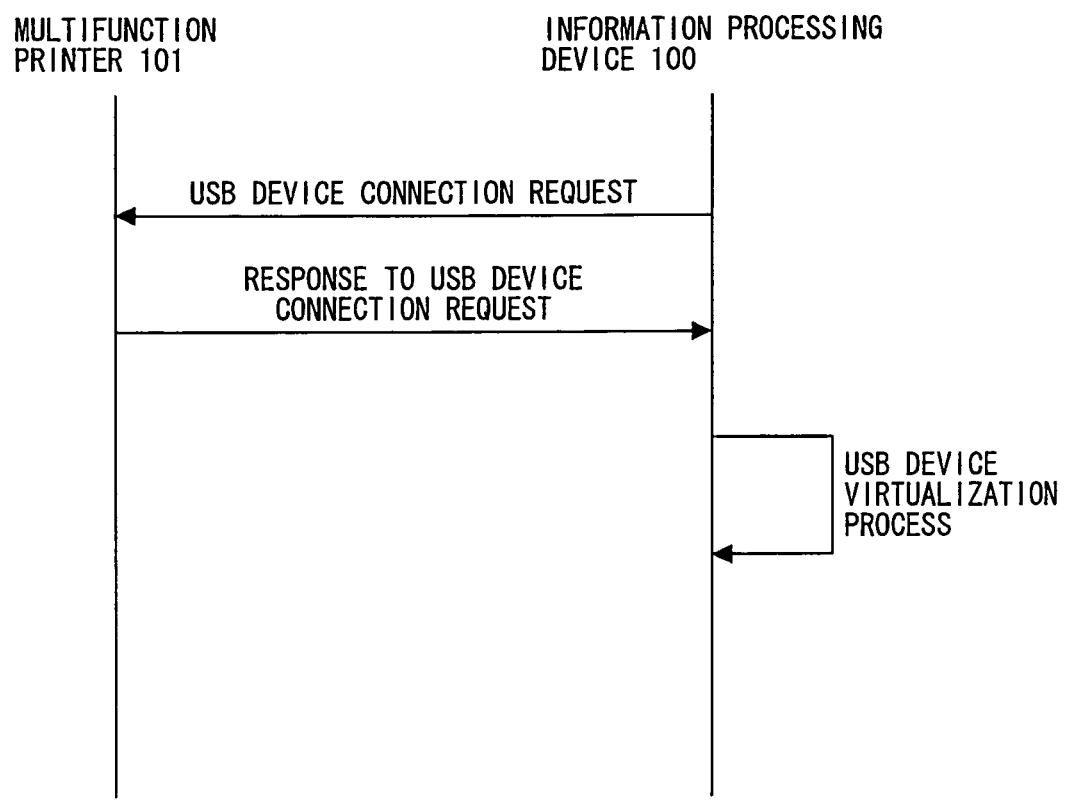
FIG. 3 is a sequence diagram illustrating signal communications for carrying out a virtualization process of a user information reading device in the external authentication system.

The following explanation deals with a sequence by which the information processing device 100 establishes a virtual connection with a user information reading device 111 that is locally connected to a multifunction printer 101, with reference to FIG. 3.

In order to virtually connect the information processing device 100 to a user information reading device 111 that is locally connected to a multifunction printer 101, the USB device management section instructing section 38 of the information processing device 100 instructs the USB device management section 32 to send a USB device connection request to the multifunction printer 101.

According to the instruction, the USB device management section 32 sends the USB device connection request to the multifunction printer 101 via the communication section 31.

In the multifunction printer 101, the USB device controlling section 19 accepts the USB device connection request from the information processing device 100 via the communication section 17. The USB device controlling section 19 carries out a necessary connection acceptance process and sends back a response to the USB device connection request. The connection acceptance process is for allowing the user information reading device 111 which is connected to the multifunction printer 101 to be accessible from the information processing device 100.

Upon receiving, from the multifunction printer 101, the response to the USB device connection request, the USB device management section 32 in the information processing device 100 carries out a virtualization process for virtually connecting the user information reading device 111 to the information processing device 100. As described above, detailed explanation of the virtualization process are omitted herein because they are described in Patent Literature 2.

Upon receiving, from the multifunction printer 101, the response to the USB device connection request, the information processing device 100 carries out a USB initialization process called "plug and play" as if the user information reading device 111 were locally connected to the information processing device 100, even though the user information reading device 111 is actually locally connected to the multifunction printer 101.

"Plug and play" is a system which allows an operation system of the information processing device 100 to automatically detect a USB device (user information reading device 111) which is connected to the information processing device 100, and to carry out a suitable setup for the USB device without any manual operation by a user.

The above series of processes allow the user information reading device 111 to be accessible from the information processing device 100 as if the user information reading device 111 were locally connected to the information processing device 100, even though the user information reading device 111 is actually locally connected to the multifunction printer 101.

Figure 4:
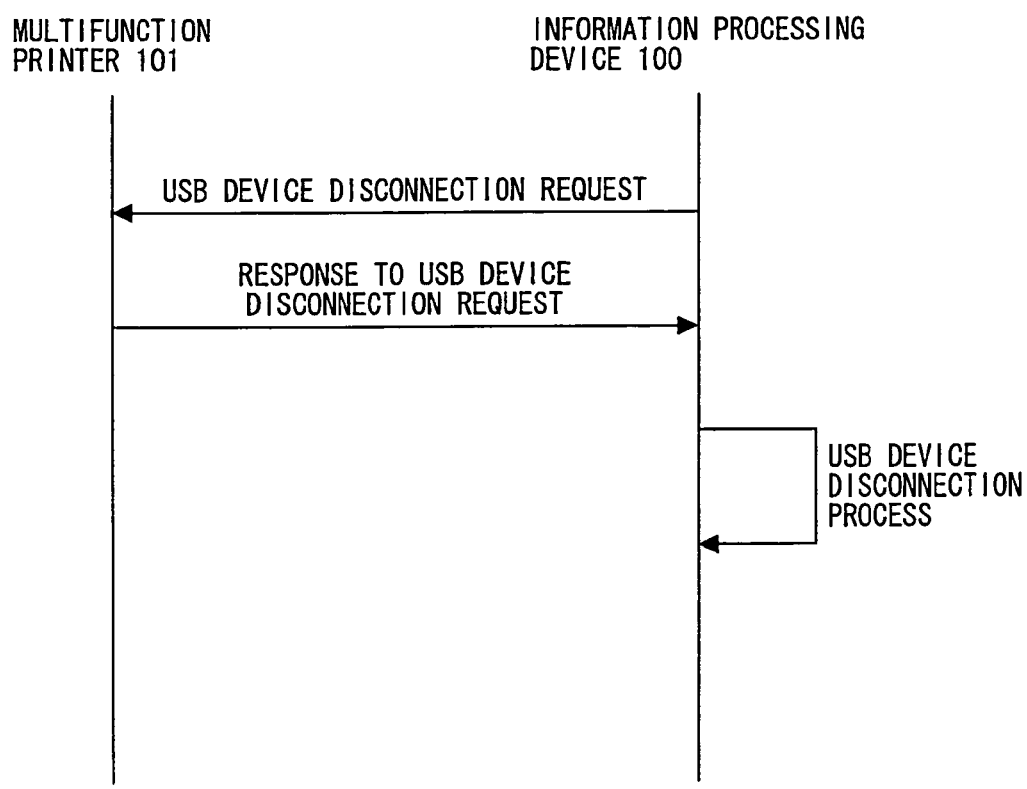
FIG. 4 is a sequence diagram illustrating signal communications for disconnecting a virtual connection of a user information device in the external authentication system.

The following explanation deals with a sequence by which the information processing device 100 disconnects the virtual connection with the user information reading device 111, with reference to FIG. 4.

In order to disconnect the user information reading device 111 which is virtually connected to the information processing device 100, the USB device management section instructing section 38 in the information processing device 100 instructs the USB device management section 32 to send a USB device disconnection request to the multifunction printer 101.

Accordingly, the USB device management section 32 sends the USB device disconnection request to the multifunction printer 101 via the communication section 31.

In the multifunction printer 101, the USB device controlling section 19 accepts, via the communication section 17, the USB device disconnection request from the information processing device 100. The USB device controlling section 19 carries out a necessary disconnection acceptance process and sends back a response to the USB device disconnection request. The process causes the user information reading device 111 that is locally connected to the multifunction printer 101 to be inaccessible from the information processing device 100.

Upon receiving, from the multifunction printer 101, the response to the USB device disconnection request, the USB device management section 32 in the information processing device 100 carries out a process for disconnecting the user information reading device 111.

Further, upon receiving, from the multifunction printer 101, the response to the USB device disconnection request, the information processing device 100 cannot access to the user information reading device 111 and the USB device management section 32 carries out a disconnection process for disconnecting the user information reading device 111 which is virtually connected to the information processing device 100.

The above series of processes allows the information processing device 100 to stop using the user information reading device 111 as if the user information reading device 111 were locally connected to the information processing device 100, even though the user information reading device 111 is actually locally connected to the multifunction printer 101.

Figure 5:
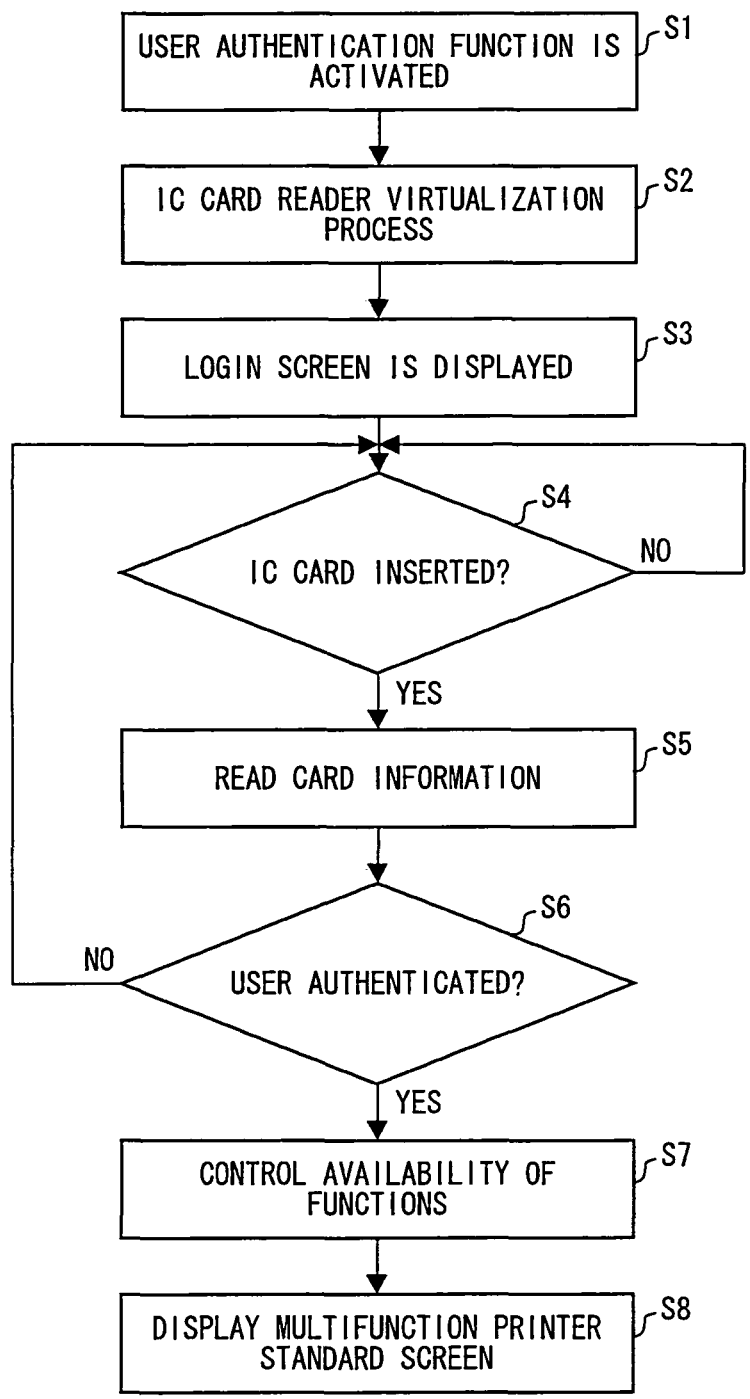
FIG. 5 is a flow chart showing a process of a user authentication in the external authentication system.

The following explanation deals with a flow when the information processing device 100 reads user information by use of a user information reading device 111 with reference to FIG. 5. In this explanation, an IC card reader is used as an example of the user information reading device 111.

When an administrator of a multifunction printer 101 activates a "user authentication" function by use of the operation section 11 in FIG. 1, an authentication function stored in the multifunction printer management section 16 is activated so that the user authentication function is activated in the multifunction printer 101 (S1).

Figures 6, 7, 8:
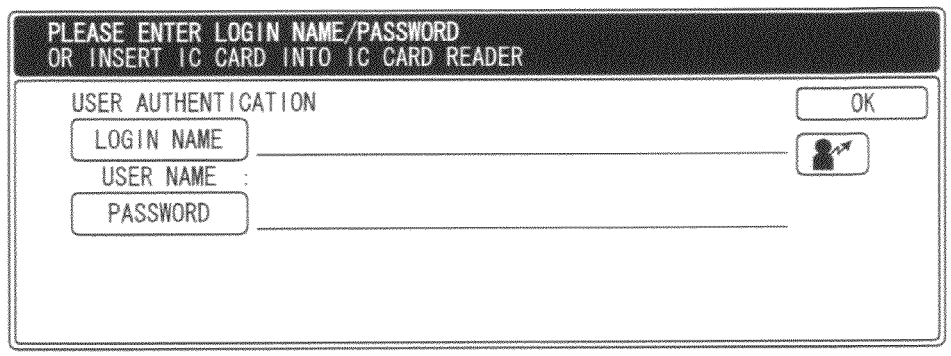
FIG. 6 is a drawing illustrating an example of a login screen displayed in S3 of the flow chart in FIG. 5.
FIG. 7 is a drawing illustrating a user information management table which is stored in a user information management database, and is referred by the authentication section in FIG. 1.
FIG. 8 is a drawing illustrating a function availability management table for controlling availability of functions of the multifunction printer in FIG. 1 depending on a user.

In a case where the user authentication is carried out by use of an IC card reader connected to the multifunction printer 101 and an account application operating in the information processing device 100, when a virtualization process of the IC card reader (S2) is successfully completed, the account application displays a login screen as illustrated in FIG. 6 on a screen of the display section 13 in the multifunction printer 101 (S3).

In order to read information of an IC card by use of an IC card reader, it is common to access the IC card reader at regular intervals so as to obtain authentication data. The information processing device 100 monitors the IC card reader to check whether an IC card is inserted or not (S4). In a case where an IC card is not inserted, the monitor of the IC card reader is continued.

On the other hand, in a case where an insertion of an IC card into the IC card reader is detected, information inside the IC card (user information for identifying a user) is read (S5). Note that there are several kinds of IC card readers, for example, a contact type IC card reader into which an IC card is inserted, whereas there is a contactless type IC card reader. The contactless type IC card reader reads information of an IC card when the IC card is held over the IC card reader.

Next, in the information processing device 100, the authentication section 37 carries out a user authentication by referring to the user information management DB 39 based on the IC card information (user information) that is thus read (S6). In a case where a user is successfully authenticated, the login screen displayed on the display section 13 of the multifunction printer 101 is closed, and the multifunction printer controlling section 36 sends to the multifunction printer 101 a command for controlling availability of functions of the multifunction printer 101 (S7) so that a multifunction printer standard screen which is suitable for the user is displayed (S8). In case of authentication failure, the login screen is still displayed on the screen and a user is requested to have the IC card read again.

The above-mentioned FIG. 6 shows an example login screen which can deal with (i) a login by use of an IC card reader and (ii) a login via a direct input from the screen displayed on the display section 13 in FIG. 1. This login screen allows a manual login from the input section 12 in FIG. 1 by entering a user name and a corresponding password for user authentication.

FIG. 7 shows an example of user authentication information which is used by the authentication section 37 for user authentication, and is managed by the user information management DB 39 in the information processing device 100. The multifunction application 34 obtains user information from a virtually connected IC card reader, and then the authentication section 37 carries out user authentication by searching for a match of the obtained user information in a user management table that is stored in the user information management DB 39.

FIG. 8 shows an example of a table for controlling availability of functions of the multifunction printer 101 depending on a user. The table is used by the multifunction printer controlling section 36. In this table, functions are managed by classifying into large categories such as copy, scan, or the like. For example, scan may be classified into more specific categories such as scan for emailing (transfer scanned data by email), scan for FTP (transfer scanned data with FTP). Further, it is also possible to manage the functions of the multifunction printer by restricting color printing (such as monochrome or full-color).

Figure 9:
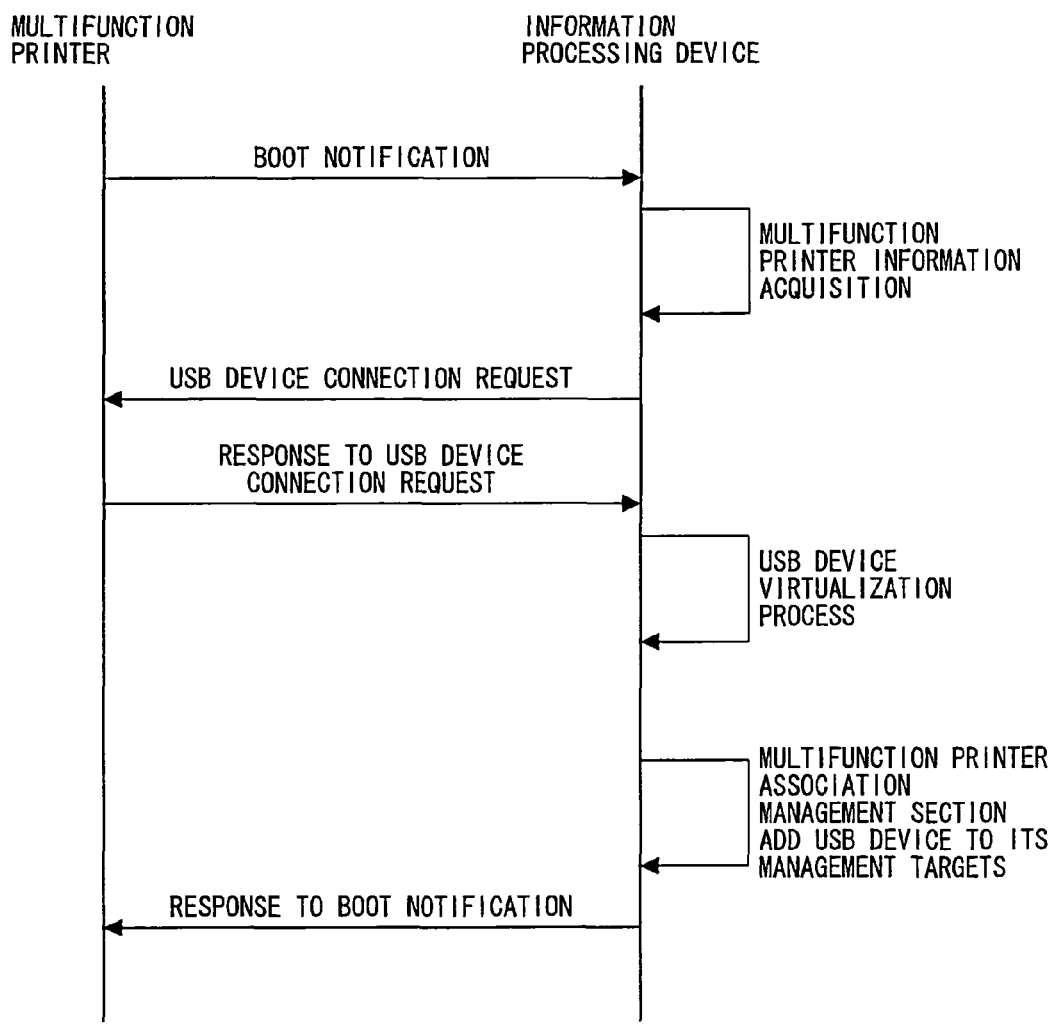
FIG. 9 is a sequence diagram illustrating signal communications when a multifunction printer is turned on in the external authentication system.
Figure 11:
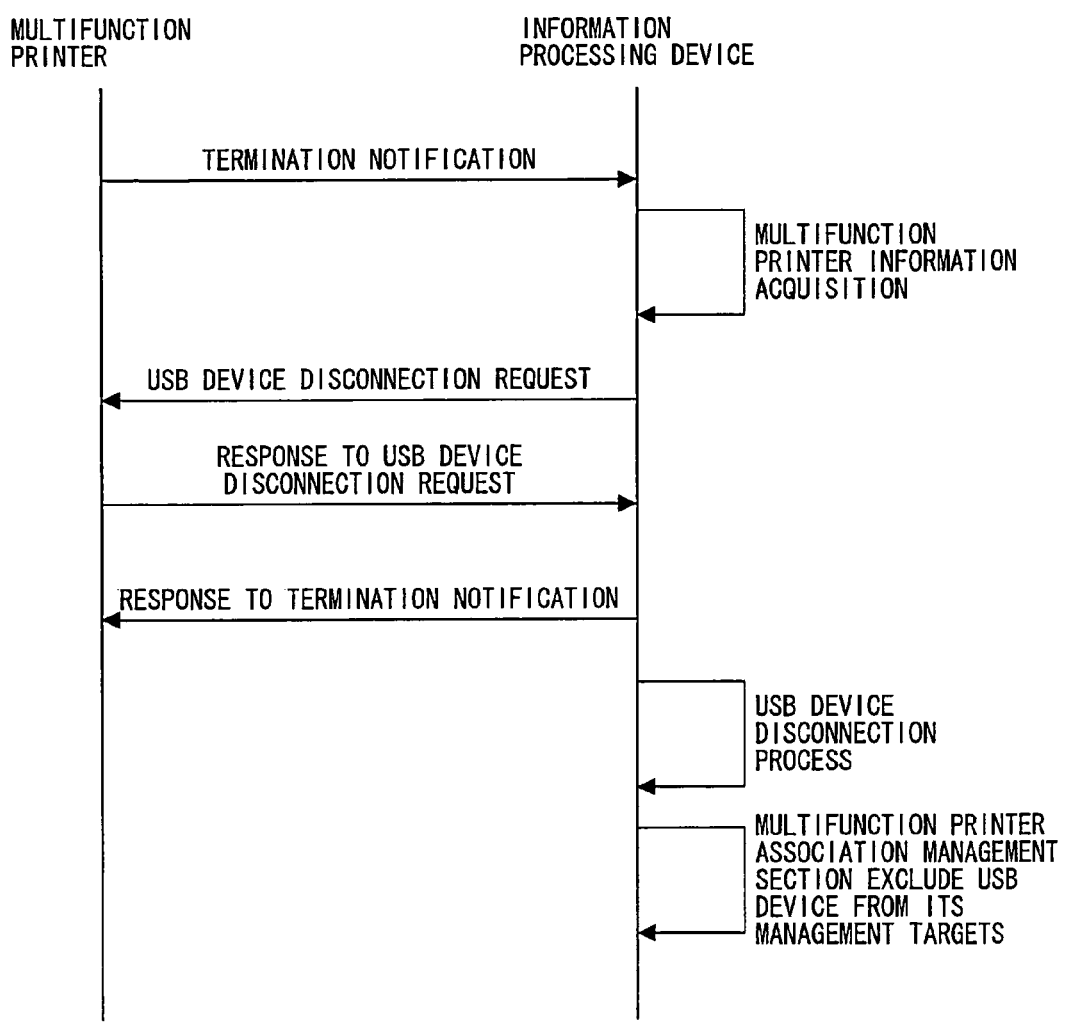
FIG. 11 is a sequence diagram illustrating signal communications when a multifunction printer is turned off in the external authentication system for a multifunction printer.

The following explanation deals with a sequence of the information processing device 100 when a multifunction printer 101 is turned on, with reference to FIG. 9.

When a multifunction printer 101 is turned on (the multifunction printer 101 is powered on by switching on its power switch), the device control section 18 in the multifunction printer 101 (i) obtains, from the multifunction printer management section 16, information of the multifunction printer application 34 operating in the application section 33 in the information processing device 100, and (ii) sends a boot notification to the information processing device 100 via the communication section 17.

By receiving the boot notification, the multifunction printer application 34 in the information processing device 100 detects that the multifunction printer 101 is turned on. In response, the USB device management section instructing section 38 instructs the USB device management section 32 to send a USB device connection request to the multifunction printer 101 that is a sender of the boot notification. Accordingly, the USB device management section 32 carries out the above described virtualization process of a user information reading device 111 with reference to FIG. 3 so that the USB device management section 32 can manage the user information reading device 111 via a virtual connection therebetween.

When the USB device management section 32 completes the virtualization process of the user information reading device 111, the multifunction printer association management section 35 adds the multifunction printer 101 to its management targets, and the multifunction printer application 34 sends back a response to the boot notification to the multifunction printer 101.

According to the above processes, from right after the activation of the multifunction printer 101, a user will be allowed to operate the multifunction printer 101 under a condition that the user is successfully authenticated.

The boot notification is, for example, a notification by use of the SOAP protocol as illustrated in FIG. 10. The boot notification includes identification information of a multifunction printer 101 with which the information processing device 100 can identify the multifunction printer 101.

The following explanation deals with a sequence of the information processing device 100 when a power switch of a multifunction printer 101 is turned off, with reference to FIG. 12.

In case where a power switch of a multifunction printer 101 is turned off, before completely turning off its power, the device controlling section 18 in the multifunction printer 101 (i) obtains, from the multifunction printer management section 16, information of the multifunction printer application 34 operating in the application section 33 in the information processing device 100, and (ii) sends a termination notification to the information processing device 100 via the communication section 17.

By receiving the termination notification, the multifunction printer application 34 in the information processing device 100 detects the multifunction printer 101 to be turned off, and send back a response to the termination notification to the multifunction printer 101 which is a sender of the termination notification. Further, the USB device management section instructing section 38 instructs the USB device management section 32 to send a USB device disconnection request to the multifunction printer 101.

Accordingly, as described above with reference to FIG. 4, the USB device management section 32 sends the USB device disconnection request to the multifunction printer 101. Upon receiving a response to the USB device disconnection request, the USB device management section 32 carries out a disconnection process of the user information reading device 111.

After completion of the disconnection process of the user information reading device 111, the multifunction printer association management section 35 excludes the multifunction printer 101 from its management targets.

As a result, it is not necessary that the information processing device 100 keep monitoring a user information reading device 111 of a multifunction printer 101 which is not used.

The multifunction printer 101 completely turns off its power after (i) processing the USB device disconnection request from the information processing device 100, and (ii) receiving a response to the termination notification from the information processing device 100.

The termination notification is, for example, a notification by use of the SOAP protocol as illustrated in FIG. 12. The termination notification includes multifunction printer information of a multifunction printer 101 with which the information processing device 100 can identify the multifunction printer 101.

Figure 13:
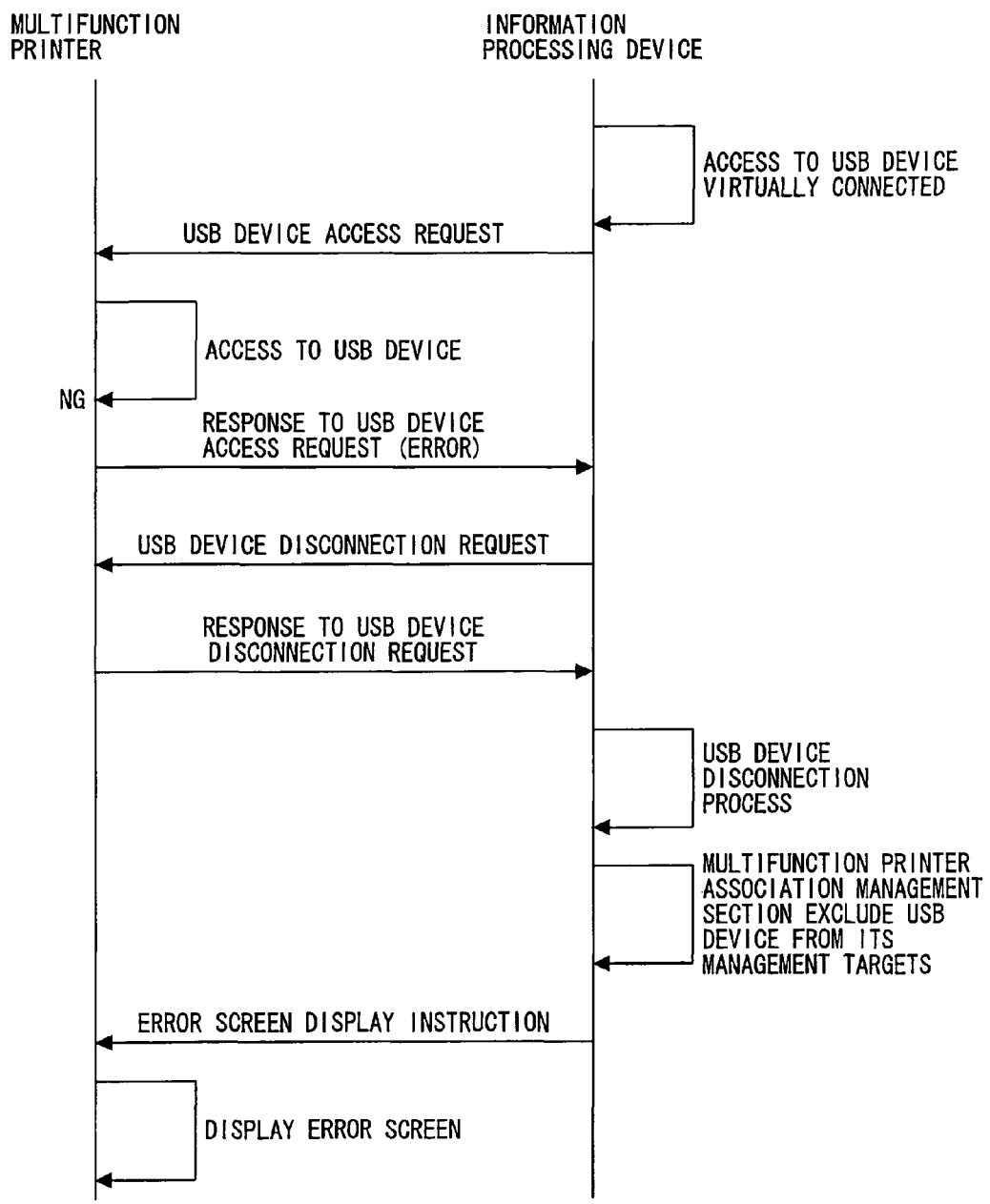
FIG. 13 is a sequence diagram illustrating signal communications when a user information reading device is disconnected in the external authentication system.

The following explanation deals with a sequence when a user information reading device 111 is disconnected with reference to FIG. 13.

In a case where a user information reading device 111 connected to a multifunction printer 101 is detached by a user, or is disconnected due to a contact failure, the multifunction printer application 34 in the information processing device 100 instructs to access to the user information reading device 111 at regular intervals, so that the information processing device 100 sends a USB device access request to the multifunction printer 101.

However, since the user information reading device 111 of the multifunction printer 101 is not physically present, the USB device controlling section 19 in the multifunction printer 101 fails to access to the user information reading device 111. Therefore, the USB device controlling section 19 sends back a response (an error) to the USB device access request to the USB device management section 32 in the information processing device 100.

This allows the multifunction printer application 34 to detect an access failure to the user information reading device 111. In response, the USB device management section instructing section 38 instructs the USB device management section 32 to send a USB device disconnection request to the multifunction printer 101.

This causes the USB device management section 32 sends, to the multifunction printer 101, a USB device disconnection request as described above with reference to FIG. 4. Upon receiving a response to the USB device disconnection request, the USB device management section 32 carries out a disconnection process of the user information reading device 111.

Further, after completion of the disconnection process of the user information reading device 111, the multifunction printer association management section 35 excludes the multifunction printer 101 from its management targets, the multifunction printer 101 being associated with the user information reading device 111.

In such situation, it is not possible for a user to carry out user authentication on the multifunction printer 101 by use of the user information reading device 111, so that the multifunction printer application 34 sends an error screen display command to the multifunction printer 101 in order to notify a disconnection of the user information reading device 111 to a user.

This allows the multifunction printer 101 to display the error screen on the display section 13. The error screen display enables that an administrator of the multifunction printer 101 can deal with the error immediately in suitable manners such as reconnecting the user information reading device 111 or the like.

The following explanation deals with the association establishment carried out by the multifunction printer association management section 35 in the information processing device 100. The association is an association between a multifunction printer 101 and a user information reading device 111 which is locally connected to the multifunction printer 101.

Firstly, a way of establishing the association by use of identification information of a user information reading device 111 will be explained. As for the identification information, a serial number, manufacturer information, a model name of the user information reading device 111 can be used. Alternatively, a combination of a model name and a manufacturer name of the user information reading device 111 can be used.

The multifunction printer association management section 35 sends a USB device information acquisition request to a multifunction printer 101. The USB device information acquisition request is for acquiring USB device information which can identify a user information reading device 111 that is locally connected to the multifunction printer 101. In response, the multifunction printer 101 sends back USB device information including a serial number of the user information reading device 111, so that the multifunction printer association management section 35 receives the USB device information.

FIG. 14 shows a sample of a response to the USB device information acquisition request. FIG. 14 shows an example by use of the SOAP protocol. However, other transmission methods such as UDP, TCP, or HTTP can be used.

Although it is described herein as one example that the multifunction printer association management section 35 sends a USB device information acquisition request to the multifunction printer 101 so as to obtain USB device information, information included in a response to the USB device information acquisition request may be included in the boot notification shown in FIG. 10. In this case, it is not necessary to send the USB device information acquisition request to the multifunction printer 101.

Figure 15:
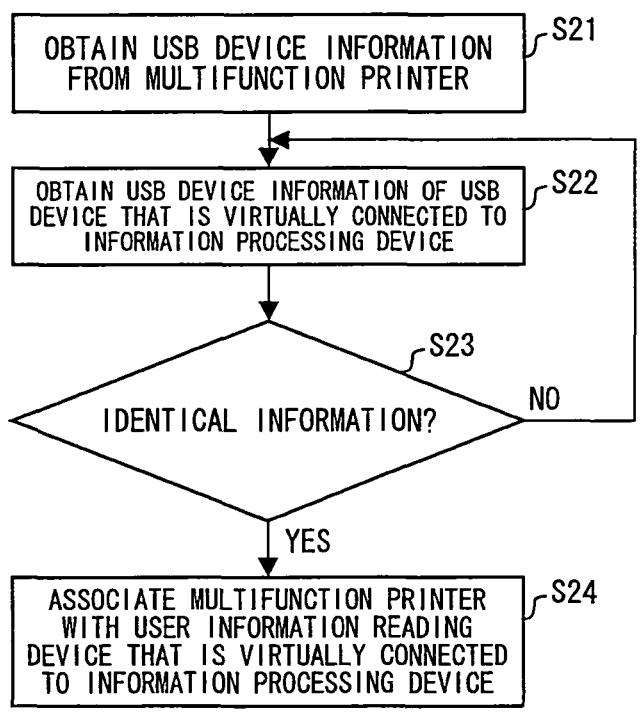
FIG. 15 is a flow chart showing a process in which a multifunction printer management section associates a multifunction printer with a user information reading device.

Further, the multifunction printer association management section 35 can obtain the USB device information of the user information reading device 111 via an interface of an operating system. FIG. 15 shows a flow for establishing an association by use of USB device information obtained in such a manner.

The multifunction printer association management section 35 obtains, from multifunction printers 101, USB device information of user information reading devices 111 that are locally connected to the multifunction printers 101, respectively (S21), and further obtains, from the USB device management section 32, USB device information of user information reading devices 111 which are virtually connected to the information processing device 100 (S22). The multifunction printer association management section 35 searches identical serial numbers by comparing two sets of USB device information obtained in S21 and S22 (S23). In a case there are identical serial numbers, the multifunction printer association management section 35 associates the multifunction printer 101 with the user information reading device 111 (S24).

After the association is established, successful authentication of user information read by the user information reading device 111 is required for making the functions of the associated multifunction printer 101 available according to configuration settings set by the multifunction printer controlling section 36.

In a case where a USB device has no serial number, the USB device has secondary information other than the serial number in most cases. According to the USB device information shown in FIG. 14, for example, manufacturer information or product information can be used in a case of searching identical information. Therefore, it is possible to establish an association by searching identical USB device information such as manufacturer information, product information, or combination thereof even though the USB device information has no serial number.

FIG. 16 shows sample information managed by the multifunction printer association management section 35. According to an example in FIG. 16, an ID number is allotted to each of the multifunction printers 101. In addition to the ID number, a model name and an IP address of each multifunction printer 101, and a model name and a serial number of each user information reading device 111 that is locally connected to a multifunction printer are managed. The ID numbers are allotted to the multifunction printers 101 in an order that the information processing device 100 sends a USB device connection request to them.

The following explanation deals with an association establishment between a user information reading device 111 and a multifunction printer 101 in a case where the association cannot be established based on identification information. In this section, a multifunction printer 101 that is firstly turned on and a user information reading device 111 that is firstly virtualized are associated with each other.

According to an instruction from the USB device management instructing section 38, the USB device management section 32 sends a USB device connection request to a multifunction printer 101 so as to carry out a virtualization process for establishing a virtual connection between a user information reading device 111 and the information processing device 100. A processing time for virtualization varies depending on a type of the user information reading device 111, or whether or not the user information reading device 111 has been used before.

For example, in a case where it is detected that a plurality of multifunction printers 101 on the LAN 200 are turned on substantially simultaneously and a USB device connection request is sent to each of the multifunction printers 101 for carrying out virtualization processes of a plurality of user information reading devices 111 simultaneously, the multifunction printer association management section 35 allots "multifunction printer ID 1" to a multifunction printer 101 to which the USB device management section instructing section 38 firstly instructs the USB device management section 32 to send a USB device connection request, and then allots "multifunction printer ID 2" to a multifunction printer 101 to which the USB device management section 32 secondly sends a USB device connection request. Further, the multifunction printer association management section 35 allots "a USB device id 1" to a user information reading device 111 which is connected to the multifunction printer ID 1, and allots "a USB device id 2" to a user information reading device 111 which is connected to the multifunction printer ID 2.

However, as described before, a virtualization process of a user information reading device 111 is not always completed in an order of being sent the USB device connection request. The user information reading device id 2 of the multifunction printer ID 2 may complete its virtualization process faster than the user information reading device id 1 of the multifunction printer ID 1, so that the user information reading device id 2 is virtually connected to the information processing device 100 before the user information reading device id 1 is. In such case, the multifunction printer ID 1 is associated with the user information reading device id 2 by establishing an association between a multifunction printer to which the USB device connection request is firstly sent and a USB device which firstly completes its virtualization process.

Therefore, even in a case where it is detected that a plurality of multifunction printers 101 are turned on substantially concurrently, the USB device management section instructing section 38 do not concurrently carry out virtualization processes of a plurality of user information reading devices 111 for the plurality of multifunction printers 101. According to a certain order, for example an order of boot detection, the information processing device 100 sends a USB device connection request to a first multifunction printer 101 in order to carry out a virtualization process of a user information reading device 111. After completing the virtualization process for the first multifunction printer 101, a USB device connection request is sent to a second multifunction printer 101.

This technique allows the multifunction printer association management section 35 to establish a correct association based on timings of (i) sending a USB device connection request to a multifunction printer 101 and (ii) establishing a virtual connection of a user information reading device 111, even in a case where the multifunction printer association management section 35 failed to receive identification information from the USB device management section instructing section 38.

Figure 17:
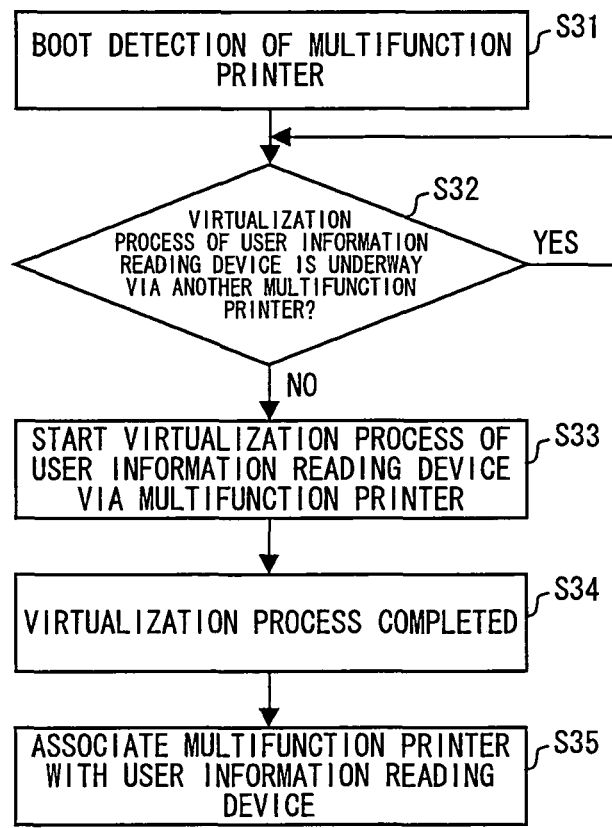

FIG. 17 shows a flow for establishing an association between a user information reading device 111 and a multifunction printer 101 based on the timings.

The USB device management section instructing section 38 detects that a multifunction printer 101 is turned on (S31).

The USB device management section 32 determines whether or not a virtualization process of a user information reading device 111 of another multifunction printer 101 is underway (S32). When a virtualization process is underway, no further operation is carried out until the virtualization is completed.

In S32, it is detected that no virtualization process is underway, the USB device management section instructing section 38 instructs the USB device management section 32 to send a USB device connection request to the multifunction printer 101 which was detected in S31 in order to carry out a virtualization process of a user information reading device 111 (S33). After completing the virtualization process carried out by the USB device management section 32 (S34), the multifunction printer association management section 35 associates the multifunction printer 101 that was detected in S31 with the user information reading device 111 whose virtualization process has been just completed (S35).

As described above, in the external authentication system for a multifunction printer according to the present embodiment, in the information processing device 100, (i) the USB device management section 32 and the USB device management section instructing section 38 carry out a virtualization process for establishing a virtual connection between the information processing device 100 and the user information reading device 111 which is locally connected to the multifunction printer 101 and manage a status of the connection between the information processing device 100 and the user information reading device 111, and (ii) the multifunction printer association management section 35 associates the multifunction printer 101 which is controlled by the information processing device 100 with the user information reading device 111 which is locally connected to the multifunction printer 101.

On the other hand, upon receiving a connection request from the information processing device 100, to request the multifunction printer 101 to allow the information processing device 100 to be connected to the user information reading device 111 that is locally connected to the multifunction printer 101, the multifunction printer 101 performs such controls that the user information reading device 111 becomes accessible from the information processing device 100. Once the user information reading device 111 is virtually connected to the information processing device 100, the multifunction printer 101 performs such control that the user information reading device 111 will not to be virtually connected to other information processing devices such as the information processing device 300. Further, upon receiving a disconnection request, from the information processing device 100, to request the multifunction printer 101 to disconnect the virtual connection between the information processing device 100 and the user information reading device 111, the multifunction printer 101 performs such control that the user information reading device 111 becomes inaccessible from the information processing device 100.

As a result, it is not necessary to install a driver of the user information reading device 111 onto the multifunction printer 101. Therefore, a model change of the user information reading device 111 dose not necessitate a new driver installation for the multifunction printer 101 and only requires the new driver installation for the information processing device 100. If the information processing device 100 has already had a driver corresponding to the new user information reading device 111, the new user information reading device 111 is ready to use by merely connecting to a multifunction printer 101.

Further, even in a case where a standard of the user information reading device 111 is changed, an adjustment is required only for the information processing device 100 and development or renewal of firmware for each of the multifunction printers is not necessary. This allows significantly reducing time and cost in comparison with a case of developing new firmware in accordance with each standard of the multifunction printers 101.

Lastly, each of the sections in the information processing device 100, in particular, the USB device management section instructing section 38, the multifunction printer association management section 35, the multifunction printer controlling section 36, and the authentication section 37 can be realized by hardware logic, or software by use of a CPU.

Namely, the information processing device 100 includes a CPU (central processing unit) for carrying out commands of a control program in order to perform each of the functions, a ROM (read only memory) for storing the program, a RAM (random access memory) for loading the program, and a storage device (storage medium) such as a memory for storing the program or various data. An object of the present invention can be achieved in such a manner that a computer readable storage medium including software for realizing the above functions is provided to the information processing device 100, the software being an information processing device 100 controlling program including program codes (execute form program, interconnecting cable program, source program), so that a computer (or a CPU, or a MPU) inside the information processing device 100 reads the program codes stored in the storage medium and carries them out.

Examples of the storage medium encompass: tapes such as a magnetic tape, and a cassette tape; magnetic discs such as a floppy disc (registered trademark), and a hard disc; discs including optical discs such as a CD-ROM, an MO, an MD, a DVD, and a CD-R; cards such as an IC card (including a memory card), and an optical card; and semiconductor memories such as a mask-ROM, an EPROM (Erasable Programmable Read Only Memory), an EEPROM (Electrically Erasable Programmable Read Only Memory), and a flash ROM.

Further, it may be possible to provide the program codes via a communication network by connecting the information processing device 100 to the communication network. The communication network is not specifically limited. Examples of the communication network encompass: the Internet, an intranet, an extranet, a LAN, an ISDN, a VAN, a CATV communication network, a virtual private network, a telephone network, a mobile communication network, and a satellite communication network. Further, a transmission medium constructing the communication network is not specifically limited. Examples of the transmission medium encompass: fixed lines such as an IEEE1394, a USB, a power line carrier, a cable TV line, a telephone line, and an ADSL; infra red rays such as an IrDA, and a remote controller; radio transmissions such as a Bluetooth (registered trademark), 802.11 radio, an HDR, a mobile communication network, a satellite communication, and a digital terrestrial network. Note that the present invention can be realized by computer data signals embedded in a carrier wave, the computer data signals being realized by electronic transmission of the program codes.

As described above, an information processing device of the present invention which is connectable to at least one multifunction printer via a communication network, carries out user authentication based on user information read by a USB device that is locally connected to a multifunction printer, and controls, according to a result of the user authentication, the multifunction printer to which the USB device is locally connected, the information processing device includes: a USB device management portion (USB device management means) for (i) requesting the multifunction printer to allow the information processing device to be connected to the USB device which is locally connected to the multifunction printer and (ii) carrying out a virtualization process for virtually connecting the USB device to the information processing device, and (iii) controlling a status of the connection between the information processing device and the USB device which is virtually connected to the information processing device; and a multifunction printer association management section (multifunction printer association management means) for associating the multifunction printer controlled by the information processing device with the USB device that is locally connected to the multifunction printer.

Further, to attain the object, a multifunction printer of the present invention to which a USB device for reading user information is locally connected, the multifunction printer being connected to, via a communication network, an information processing device which controls functions of the multifunction printer in such a manner that (i) the multifunction printer sends user identification information read by the USB device to the information processing device, and (ii) the information processing device carries out user authentication based on the read user information, and (iii) the information processing device controls the functions of the multifunction printer based on a result of the user authentication, the multifunction printer including: a USB device controlling section (USB device controlling means) (i) which controls the USB device locally connected to the multifunction printer to be accessible from the information processing device by virtually connecting the USB device to the information processing device in response to a connection request from the information processing device to request the USB device controlling section to allow the information processing device to be connected to the USB device, (ii) which, after the USB device is virtually connected to the information processing device, controls the USB device not to be virtually connected to other information processing devices, and which (iii) in response to a USB device disconnection request from the information processing device controls the USB device to be inaccessible from the information processing device.

An external authentication system for a multifunction printer according to the present invention includes an information processing device of the present invention and a multifunction printer of the present invention.

According to the external authentication system for a multifunction printer which is the present invention, a model change of the USB device does not necessitate a new driver installation to a multifunction printer to which a new USB device is locally connected. It is possible to use the new USB device after installation of the new driver to the information processing device. If the driver of the new USB device has already been installed to the information processing device, the new USB device can be used by a multifunction printer without any trouble.

Further, in a case where a standard of the USB device is changed, an adjustment is required only for the information processing device and development or renewal of firmware for a multifunction printer is not necessary. This allows significantly reducing time and cost in comparison with a case of developing firmware in accordance with each standard of the multifunction printers.

Further, the information processing device of the present invention may have an arrangement such that the multifunction printer association management section associates the USB device with the multifunction printer to which the USB device is locally connected by obtaining identification information of the USB device from the multifunction printer to which the USB device is locally connected.

By using USB device identification information, the multifunction printer management section can easily associate a USB device with a multifunction printer to which the USB device is locally connected. As for the USB device identification information, for example, a serial number, manufacturer information, or a model name of a USB device can be used. In case where a USB device has no serial number, it is possible to identify the USB device by use of secondary identification information such as manufacturer information, or a model name of the USB device.

Further, the information processing device of the present invention may have an arrangement such that, in a case where the information processing device is connected with a plurality of the multifunction printers, the USB device management portion carries out the virtualization process for the multifunction printers one by one, so that the virtualization process is not carried out for two or more of the multifunction printers concurrently, and at timing when the virtual connection is established, the multifunction printer association management section associates the USB device with the multifunction printer to which the USB device is locally connected.

In a case where a USB device has neither a serial number nor manufacturer information serving as identification information of the USB device, as described above, the information processing device requests a multifunction printer to allow the information processing device to be connected to a USB device and carries out one virtualization process at a time for virtually connecting the USB device to the information processing device. This allows the information processing device to associate a USB device with a multifunction printer to which the USB device is locally connected at timing when the USB device is virtually connected to the information processing device.

Further, the information processing device of the present invention may have an arrangement such that when the USB device management portion detects a multifunction printer is turned on, the USB device management portion requests the multifunction printer to allow the information processing device to be connected to the USB device that is locally connected to the multifunction printer.

According to the above arrangement, the information processing device adds a multifunction printer to its management targets when the multifunction printer is turned on. This allows a user to carry out a user authentication by use of a USB device right after turning on a multifunction printer.

Further, the information processing device of the present invention may have an arrangement such that when the USB device management portion detects that the multifunction printer is turned off, the USB device management portion requests the multifunction printer to disconnect the information processing device from the USB device which is locally connected to the multifunction printer, in order to terminate the management of the status of the connection between the USB device and the information processing device.

Further, the information processing device of the present invention may have an arrangement such that when the USB device management portion detects that the USB device is detached from that multifunction printer to which the USB device has been locally connected, the USB device management portion terminates the management of the status of the connection between the USB device and the information processing device by requesting the multifunction printer to disconnect from the USB device.

This prevents the USB device management portion from keep observing a USB device which is inoperable, because (i)

a multifunction printer to which the USB device is locally connected is turned off, or (ii) the USB device is detached from the multifunction printer.

Further, in the information processing device of the present invention, the USB devices may be an IC card reader for reading an IC card in which the user information is stored, or a biometric authentication device which obtains the user information by reading a physical feature of a user.

In many cases, an IC card reader or a biometric authentication device which can carry out fingerprint authentication or a face authentication has been used as a USB device for reading user information for identifying a user. Since such versatile USB devices are available, it is possible to establish a system which is suitable for a user environment with ease.

Further, the scope of the present invention includes the external authentication system for a multifunction printer including the information processing device and the multifunction printer of the present invention, a program for causing a computer to perform as the multifunction printer management section and the USB device management section instructing section of the information processing device of the present invention, and a computer readable storage medium including the program therein.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An information processing device which is connectable to at least one multifunction printer via a communication network, carries out user authentication based on user information read by a user information reading device that is locally connected to a multifunction printer, and controls, according to a result of the user authentication, the multifunction printer to which the user information reading device is locally connected, the information processing device comprising:
a user information reading device management portion for (i) requesting the multifunction printer to allow the information processing device to be connected to the user information reading device which is locally connected to the multifunction printer and (ii) carrying out a virtualization process for virtually connecting the user information reading device to the information processing device, and (iii) controlling a status of the connection between the information processing device and the user information reading device which is virtually connected to the information processing device; and
a multifunction printer association management section for associating the multifunction printer controlled by the information processing device with the user information reading device that is locally connected to the multifunction printer.

2. The information processing device according to claim 1, wherein:
the multifunction printer association management section associates the user information reading device with the multifunction printer to which the user information reading device is locally connected by obtaining identification information of the user information reading device from the multifunction printer to which the user information reading device is locally connected.

3. The information processing device according to claim 2, wherein:
the identification information of the user information reading device is a serial number serving of the user information reading device.

4. The information processing device according to claim 2, wherein:
the identification information of the user information reading device is manufacturer information of the user information reading device, a model name of the user information reading device, or a combination of the manufacturer information and the model name.

5. The information processing device according to claim 1, wherein:
in case where the information processing device is connected with a plurality of multifunction printers, the user information reading device management portion carries out the virtualization process for the multifunction printers one by one, so that the virtualization process is not carried out for two or more of the multifunction printers concurrently, and
at timing when the virtualization connection is established, the multifunction printer association management section associates the user information reading device with the multifunction printer to which the user information reading device is locally connected.

6. The information processing device according to claim 1, wherein:
when the user information reading device management portion detects a multifunction printer is turned on, the user information reading device management portion requests the multifunction printer to allow the information processing device to be connected to the user information reading device that is locally connected to the multifunction printer.

7. The information processing device according to claim 1, wherein:
when the user information reading device management portion detects that the multifunction printer is turned off, the user information reading device management portion requests the multifunction printer to disconnect the information processing device from the user information reading device which is locally connected to the multifunction printer, in order to terminate the management of the status of the connection between the user information reading device and the information processing device.

8. The information processing device according to claim 1, wherein:
when the user information reading device management portion detects that the user information reading device is detached from that multifunction printer to which the user information reading device has been locally connected, the user information reading device management portion terminates the management of the status of the connection between the user information reading device and the information processing device by requesting the multifunction printer to disconnect from the user information reading device.

9. The information processing device according to claim 1, wherein:
the user information reading device is an IC card reader for reading an IC card in which the user information is stored.

10. The information processing device according to claim 1, wherein:
the user information reading device is a biometric authentication device which obtains the user information by reading a physical feature of the user.

11. A non-transitory computer readable recording medium comprising a program for causing a computer to perform as a multifunction printer association management section and a user information reading device management portion of an information processing device according to claim 1.

12. A multifunction printer to which a user information reading device for reading user information is locally connected, the multifunction printer being connected to, via a communication network, an information processing device which controls functions of the multifunction printer in such a manner that (i) the multifunction printer sends user information read by the user information reading device to the information processing device, and (ii) the information processing device carries out user authentication based on the received user information, and (iii) the information processing device controls the functions of the multifunction printer based on the result of the use authentication, the multifunction printer comprising:
a user information reading device controlling section (i) which controls the user information reading device locally connected to the multifunction printer to be accessible from the information processing device by virtually connecting the user information reading device to the information processing device in response to a connection request from the information processing device to request the user information reading device controlling section to allow the information processing device to be connected to the user information reading device, (ii) which, after the user information reading device is virtually connected to the information processing device, controls the user information reading device not to be virtually connected to other information processing devices, and which (iii) in response to a user information reading device disconnection request from the information processing device, controls the user information reading device to be inaccessible from the information processing device.

13. An external authentication system for a multifunction printer comprising:
an information processing device; and
a multifunction printer which is connected to the information processing device via a communication network,
the information processing device which is connectable to at least one multifunction printer via the communication network, carrying out user authentication based on user information read by a user information reading device that is locally connected to the multifunction printer, and controlling, according to a result of the user authentication, the multifunction printer to which the user information reading device is locally connected,
the information processing device comprising:
a user information reading device management portion for (i) requesting the multifunction printer to allow the information processing device to be connected to the user information reading device which is locally connected to the multifunctional printer and (ii) carrying out a virtualization process for virtually connecting the user information reading device to the information processing device, and (iii) controlling a status of the connection between the information processing device and the user information reading device which is virtually connected to the information processing device; and
a multifunction printer association management section for associating the multifunction printer controlled by the image processing device with the user information reading device that is locally connected to the multifunction printer,
the multifunction printer bring locally connected to the user information reading device for reading the user information and being connected to, via the communication network, the information processing device which controls functions of the multifunction printer in such a manner that (i) the multifunction printer sends user information read by the user information reading device to the information processing device, and (ii) the information processing device carries out user authentication based on the received user information, and (iii) the information processing device controls the functions of the multifunction printer based on the result of user authentication,
the multifunction printer comprising:
a user information reading device controlling section (i) which controls the user information reading device locally connected to the multifunction printer to be accessible from the information processing device by virtually connecting the user information reading device to the information processing device in response to a connection request from the information processing device to request the user information reading device controlling section to allow the information processing device to be connected to the user information reading device, (ii) which, after the user information reading device is virtually connected to the information processing device, controls the user information reading device not to be virtually connected to other information processing devices, and which (iii) in response to a user information reading device disconnection request from the information processing device, controls the user information reading device to be in accessible from the information processing device.

* * * * *